C. T. EVANS.
CIRCUIT CONTROLLER.
APPLICATION FILED APR. 15, 1916.
1,305,268.
Patented June 3, 1919.
2 SHEETS—SHEET 1.
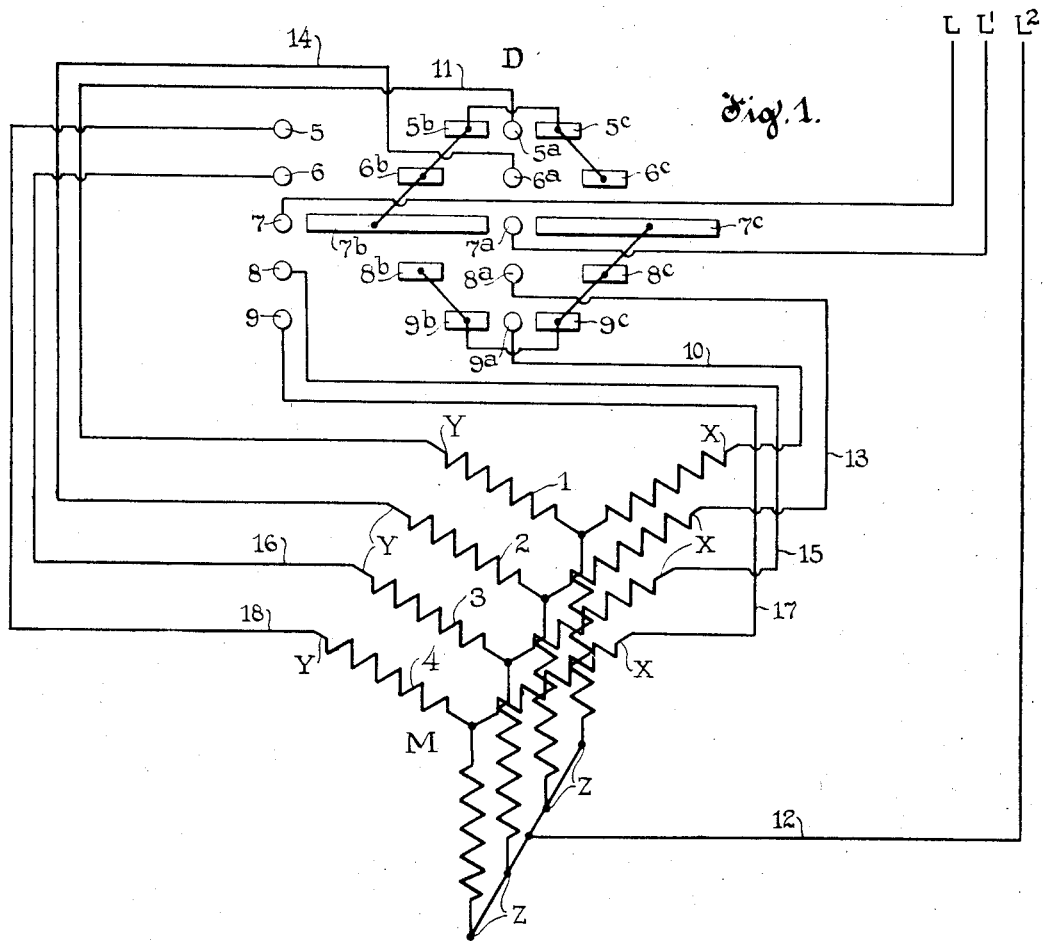
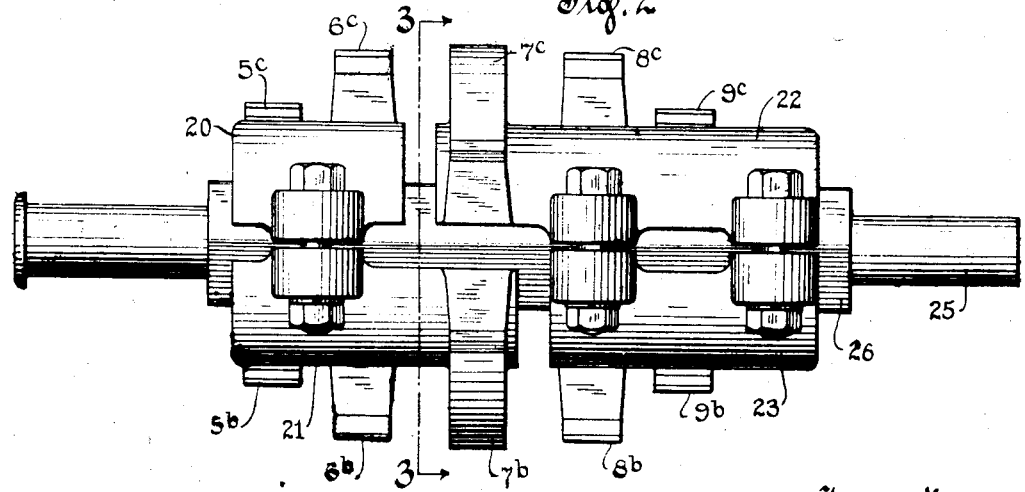
Inventor
Clarence T. Evans
By Frank H. Hubbard
Attorney

C. T. EVANS.
CIRCUIT CONTROLLER.
APPLICATION FILED APR. 15, 1916.

1,305,268.

Patented June 3, 1919.
2 SHEETS—SHEET 2.

Inventor
Clarence T. Evans
By Frank H. Hubbard
Attorney

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT-CONTROLLER.

1,305,268.  Specification of Letters Patent.  Patented June 3, 1919.

Application filed April 15, 1916. Serial No. 91,360.

*To all whom it may concern:*

Be it known that I, CLARENCE T. EVANS, a citizen of the United States, residing at Milwaukee, in the county of Milwaukee and State of Wisconsin, have invented new and useful Improvements in Circuit-Controllers, of which the following is a full, clear, concise, and exact description, reference being had to the accompanying drawing, forming a part of this specification.

This invention relates to improvements in circuit controllers, and is particularly applicable to controllers for alternating current motors.

Certain types of alternating current motors are provided with a plurality of windings to be commutated for speed regulation and to be subjected to phase reversals for reversals in direction of operation, and this invention has among its objects to provide a simple and compact drum controller to effect commutation and phase reversal of the windings of such motors.

A further object is to provide a drum controller wherein provision is made for establishment of the desired alternative connections by the same stationary and movable contacts through a mere variation in the coaction thereof.

Other objects and advantages of the invention will hereinafter appear.

The accompanying drawing illustrates certain embodiments of the invention which will now be described, it being understood that the embodiments of the invention shown are susceptible of modification falling within the scope of the appended claims.

In the drawing,

Figure 1 shows schematically and diagrammatically one embodiment of the invention as employed to commutate the windings of a three phase alternating current motor;

Fig. 2 shows in elevation a mechanical embodiment of the controller drum schematically illustrated in Fig. 1;

Figure 3:
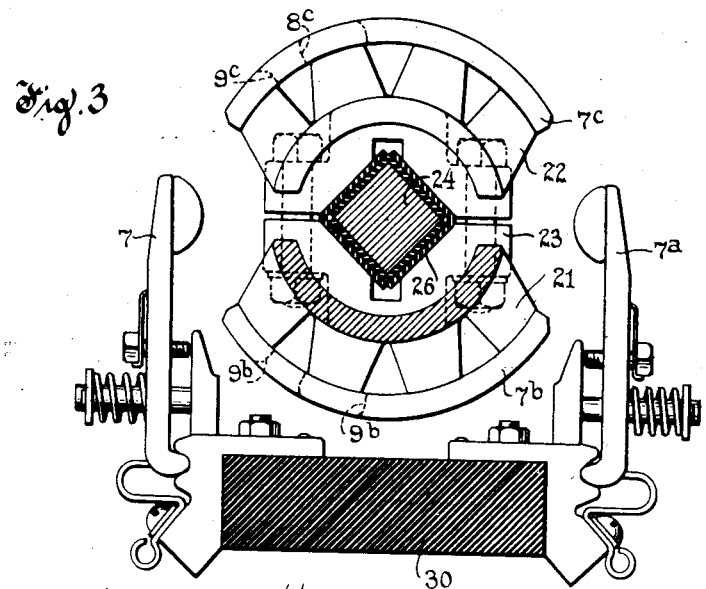
Fig. 3 shows a section of the drum taken on line 3—3, Fig. 2, together with coöperating stationary contacts.

Referring to Fig. 1 the same shows an alternating current motor M provided with four star connected primary windings 1, 2, 3 and 4. These windings provide for operation of the motor at different speeds and are adapted to be connected to the three phase supply circuit L—L'—L² selectively and progressively in the order named.

The schematically illustrated controller D provides for selective and progressive connection of the motor windings and further provides for varying certain connections between said windings and the supply circuit to effect reverse operations of the motor. It includes two sets of stationary contacts 5 to 9 and 5ª to 9ª and two sets of coöperating drum segments 5ᵇ, 5ᶜ, 6ᵇ, 6ᶜ, 7ᵇ and 7ᶜ, 8ᵇ, 8ᶜ, 9ᵇ, 9ᶜ, the segments of each set being electrically connected. The contacts having the same reference numerals are in horizontal alinement and the same is true of the segments, while the said segments are arranged to coöperate with the contacts bearing corresponding reference numerals. The drum carrying the segments is movable in opposite directions from the position illustrated to occupy either of four operative positions and as will be understood, movement of the drum in one direction effects coaction between segments 5ᵇ to 9ᵇ and contacts 5 to 9 and between segments 5ᶜ to 9ᶜ and contacts 5ª to 9ª, while reverse movement of the drum effects coaction between segments 5ᶜ to 9ᶜ and contacts 5 to 9 and between segments 5ᵇ to 9ᵇ and contacts 5ª to 9ª.

More specifically counter-clockwise movement of the drum to its first position engages segments 5ᵇ, 7ᵇ, and 9ᵇ with contacts 5ª, 7ª and 9ª and engages segment 7ᶜ with contact 7. This establishes circuit from line L to contact 7 and segment 7ᶜ, thence to connected segment 9ᵇ and contact 9ª, by conductor 10 to terminal X of winding 1, while establishing circuit from line L' to contact 7ª and segment 7ᵇ, thence to segment 5ᵇ and contact 5ª, by conductor 11 to terminal Y of winding 1, the terminals Z of all windings being directly connected to line L² by conductor 12. Continued movement of the drum to its second position disengages segments 5ᵇ and 9ᵇ from their respective contacts and effects engagement of segments 6ᵇ and 8ᵇ with contacts 6ᵃ and 8ᵃ. This establishes circuit from line L to segment 7ᶜ as already described, thence to segment 8ᵇ and contact 8ᵃ by conductor 13 to terminal X of winding 2, while establishing circuit from line L' to segment 7ᵇ as already traced and thence to segment 6ᵇ and contact 6ᵃ by conductor 14 to terminal Y of winding 2. Continued movement of the controller to its third position disengages segments 6ᵇ and 8ᵇ from contacts 6ᵃ and 8ᵃ and effects engagement of segments 6ᶜ and 8ᶜ with contacts 6 and 8. This establishes a circuit from line L to segment 7ᶜ as traced, and thence to segment 8ᶜ and contact 8, by conductor 15 to terminal X of winding 3, while establishing circuit from line L' to segment 7ᵇ and thence to segment 6ᶜ and contact 6, by conductor 16 to terminal Y of said winding. Finally movement of the controller to its fourth position disengages segments 6ᶜ and 8ᶜ from their respective contacts and effects engagement of said segments 5ᶜ and 9ᶜ with contacts 5 and 9. This establishes circuit from line L to segment 7ᶜ as traced, and thence to segment 9ᶜ and contact 9, by conductor 17 to terminal X of winding 4, while establishing circuit from line L' to segment 7ᵇ and thence to segment 5ᶜ and contact 5, by conductor 18 to terminal Y of winding 4. Reverse movement of the drum from initial position engages segment 7ᵇ with contact 7 and contact 7ᶜ with contact 7ᵃ, whereby the line connection between the two sets of segments is reversed with the obvious result of reversing the connections between winding terminals X and Y and lines L and L' to thereby provide for reversal of the motor. Upon such reverse operation of the drum the commutation of the windings is effected in the same manner as that above described; that is, by progressive engagement of the segments of the drum with contacts 5ᵃ—7ᵃ—9ᵃ, 6ᵃ—8ᵃ and 5—9. Under these conditions, however, the contacts 5ᵃ and 9ᵃ are engaged by segments 5ᶜ and 9ᶜ respectively, contacts 6ᵃ and 8ᵃ by segments 6ᶜ and 8ᶜ respectively, contacts 6 and 8 by segments 6ᵇ and 8ᵇ respectively and contacts 5 and 9 by segments 5ᵇ and 9ᵇ respectively.

In connection with the controller it will be noted that the drum requires but two insulated sections; that the segments of the two sections are arranged in identically the same relation and that the commutating segments of each section are so arranged as to coöperate with the same contacts upon reverse operations of the drum and so as to require but an equal number of said contacts. Moreover, it will be noted that the two segments 7ᵇ and 7ᶜ are horizontally alined to utilize common contacts and to require but two contacts for reversing purposes. The contact arrangement thus enables the controller to be embodied in exceedingly simple and compact form, as for example, that illustrated in Figs. 2 and 3.

Referring to Figs. 2 and 3, the drum is for convenience formed in four parts—20, 21, 22 and 23 assembled upon a rectangular section 24 (Fig. 3) of a shaft 25, an insulating sleeve 26 being interposed between the shaft and drum parts to insulate the latter from the former. The parts 20 and 21 are matched and secured together to form one drum section, while the parts 22, 23 are matched and secured together to form the other drum section. The drum section 20—21 is designed to carry the set of segments 5ᵇ to 7ᵇ, 5ᶜ and 6ᶜ, while the section 22—23 is designed to carry segments 7ᶜ to 9ᶜ, 8ᵇ and 9ᵇ. Also, the section 22—23 is designed to carry an additional segment (not shown) and hence the slight elongation thereof as compared with section 20—21. Otherwise the two drum sections are identical and are constructed to overlap for alinement of the segments 7ᵇ and 7ᶜ and obviously should no additional segment be desired the drum section 22—23 might be made identical with section 20—21 thereby making said sections interchangeable. As best illustrated in Fig. 3, the drum sections are provided with radial lugs to support the contacts and this view of the drum, which is taken on line 3—3 of Fig. 2 shows the radial positions of the segments. It shows in full lines the segment 7ᶜ on section 22—23 and the segment 7ᵇ on section 20—21, while it shows in dotted lines the segments 8ᵇ, 8ᶜ, 9ᵇ and 9ᶜ of said section 22—23. Still further it shows the stationary contacts 7 and 7ᵃ and by means thereof illustrates the relation of the two series of stationary contacts with respect to the drum sections. These contacts are of conventional form and are supported upon a base 30 which serves also to support all of the remaining contacts. Fig. 3 shows the segments and contacts in the same relation as Fig. 1 and it will be obvious from the arrangement of the segments on the drum sections that they will coöperate with said contacts in the manner above described upon reverse movements of the drum.

Figure 4:
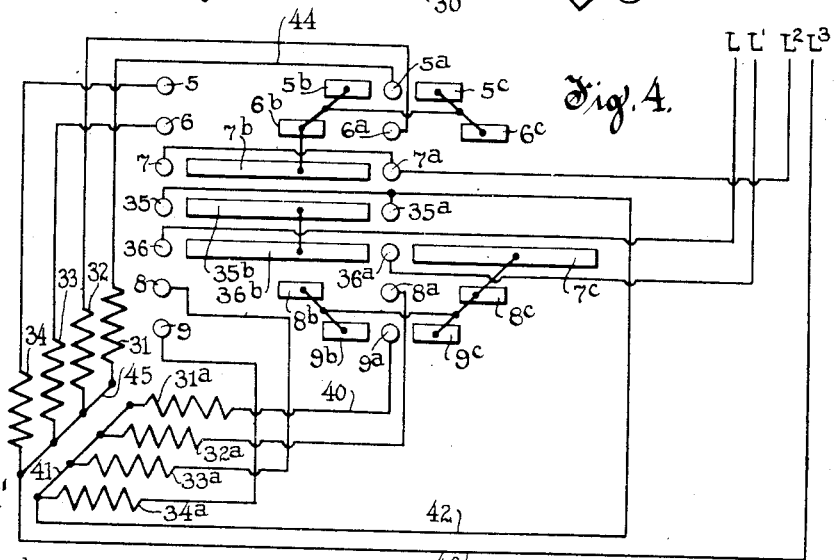
Fig. 4 shows schematically and diagrammatically a modification of the controller shown in Figs. 1 to 3 to adapt the same to a two phase alternating current motor; and, Fig. 5 shows a modification of the drum of Fig. 2 to correspond with the modifications schematically shown in Fig. 4.

Fig. 4 shows a motor M' of the two-phase type to be supplied from a four wire circuit L—L'—L²—L³. This motor, like the motor of Fig. 1, is provided with four sets of primary windings designated as 31—31ᵃ, 32—32ᵃ, 33—33ᵃ and 34—34ᵃ, said windings to be selectively and progressively connected to the supply circuit in pairs. Further, it shows a controller for said motor structurally the same as the controller of Fig. 1 except for the addition of four contacts 35, 35ᵃ, 36 and 36ᵃ and of an electrically independent drum section having segments 35ᵇ and 36ᵇ to coöperate with said contacts. However, the remaining contacts and segments of the controller which have been given the same reference characters as in Fig. 1 are slightly rearranged so that segment $7^c$ alines with segment $36^b$ and contacts 36 and $36^a$.

The arrangement is such that upon movement of the drum counter clockwise to its first position of the segments $5^b$, $7^b$, $35^b$, $36^b$, $9^b$ and $7^c$ engage contacts $5^a$, $7^a$, $35^a$, $36^a$, $9^a$ and 36 respectively. This establishes a circuit from line L to contact 36 and segment $7^c$, thence to segment $9^b$ and contact $9^a$, by conductor 40 to and through winding $31^a$, by conductors 41 and 42 to contact $35^a$ and segment $35^b$, thence to segment $36^b$ and contact $36^a$ to line L', while establishing circuit from line $L^2$ to contact $7^a$ and segment $7^b$, to segment $5^b$ and contact $5^a$, by conductor 44 to and through winding 31, by conductors 45 and 46 to line $L^3$. Continued counterclockwise movement of the controller excludes from circuit windings 31 and $31^a$ in the manner described, progressively includes in circuit the remainder of the windings, the sequence being the same as described in connection with Fig. 1. On the other hand, reverse operation of the controller from initial position first effects engagement of segments $7^b$, $35^b$, $36^b$, $5^c$, $7^c$, $9^c$ with contacts 7, 35, 36, $5^a$, $36^a$ and $9^a$ respectively. This provides for reversal of the connections between windings $31^a$ to $34^a$ and lines L and L'. For example, under such conditions circuit extends from line L to contact 36 and segment $36^b$, thence to segment $35^b$ and contact 35, by conductors 42 and 41 to the left hand terminals of windings $31^a$ to $34^a$, whereas the right hand terminals of said windings are adapted for connection through segments $8^c$, $9^c$, $8^b$, $9^b$ to segment $7^c$ and contact $36^a$ to line L', which is the reverse of the connections previously described.

Figure 5:
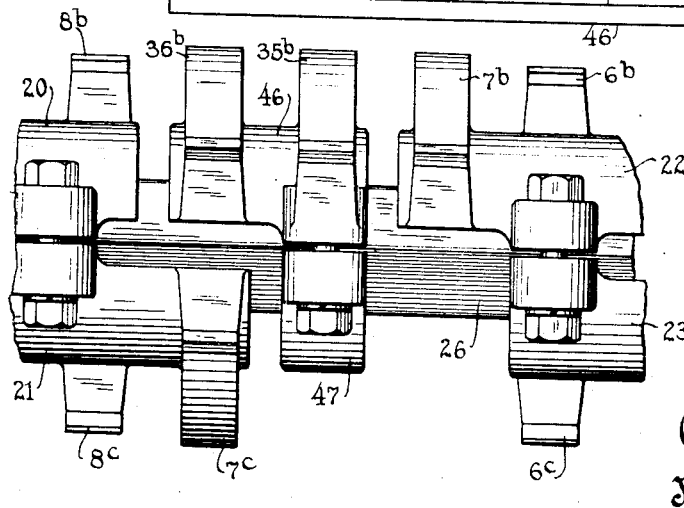

The aforesaid modification of the contact drum is illustrated in Fig. 5 and as will be apparent from this figure, the modification is of an extremely simple character. The drum sections 20—21 and 22—23 are merely separated axially and an additional drum section formed of matched parts 46—47 inserted therebetween, no alteration of the original drum sections being required. The additional section 46—47 is provided to carry the additional segments $35^b$ and $36^b$ and said drum section is arranged to overlap section 22—23 for alinement of segment $36^b$ with segment $7^c$ to correspond with the schematic illustration of the drum in Fig. 4.

What I claim as new and desire to secure by Letters Patent is:

1. In a controller for an alternating current motor having a plurality of polyphase windings, in combination, a plurality of sets of stationary contacts, certain of each set for connection to the motor windings and others of each set for connection to a polyphase supply circuit and a contact drum having a plurality of sets of segments to coöperate with said contacts for commutation and phase reversal of the motor windings, the sets of commutating segments being identical.

2. In a controller for an alternating current motor having a plurality of polyphase windings, in combination, stationary contacts, certain for connection to the motor windings and others for connection to a polyphase supply circuit and a contact drum having a plurality of like sets of segments to coöperate with said contacts for commutation and phase reversal of the motor windings, each of said sets of segments including certain of the reversing and commutating segments.

3. In a controller for an alternating current motor having a plurality of polyphase windings, in combination, stationary contacts, certain for connection to the motor windings and others for connection to a polyphase supply circuit and a contact drum having a plurality of sets of segments to coöperate with said contacts for commutation and phase reversal of the motor windings, each set including a like number of reversing and commutating segments.

4. In a controller for an alternating current motor having a plurality of polyphase windings, in combination, stationary contacts for connection to the motor windings and others for connection to a polyphase supply circuit and a drum having segments to coöperate with said contacts for commutation and phase reversal of the motor windings, said drum being rotatable in opposite directions from a neutral position for phase reversals and upon rotation in reverse directions effecting commutation of the motor windings by the same segments and contacts.

5. In a controller for an alternating current motor having a plurality of polyphase windings, in combination, stationary contacts for connection to the motor windings and others for connection to a polyphase supply circuit and a drum having segments to coöperate with said contacts for commutation and phase reversal of the motor windings, said drum being rotatable in opposite directions from a neutral position for phase reversal, and upon rotation in reverse directions effecting the commutation of the motor windings by the same segments and contacts, the segments being arranged to engage their respective stationary contacts in the same order of the latter upon reverse operations of the drum.

6. In a controller for an alternating current motor having a plurality of polyphase windings, in combination, stationary contacts, certain for connection to the motor windings and others for connection to a polyphase supply circuit and a contact drum rotatable in opposite directions from a given position and having segments to coöperate with said contacts for phase reversal and commutation of the motor windings, said segments and contacts being arranged for utilization of all upon operation of said drum in either direction.

7. In a controller for an alternating current motor having a plurality of polyphase windings, in combination, stationary contacts, certain for connection to the motor windings and others for connection to a polyphase supply circuit, said contacts being arranged in two series and a contact drum rotatable in opposite directions from a neutral position to coöperate with said contacts for commutation and phase reversal of the motor windings, said drum having commutating segments each to coact selectively with contacts of said two series according to the direction of rotation of said drum and said commutating segments being arranged to engage their respective stationary contacts in the same order of the latter upon reverse operations of said drum.

8. In a controller for an alternating current motor having a plurality of polyphase windings, in combination, stationary contacts, certain for connection to the motor windings and others for connection to a polyphase supply circuit, said contacts being arranged in two series and a contact drum rotatable in opposite directions from a neutral position to coöperate with said contacts for commutation and phase reversal of the motor windings, said drum having two sets of commutating segments, each set including a like number of segments for reversal and commutation, to coact selectively with contacts of each of said two series according to the direction of rotation of said drum, and said commutating segments being arranged to engage their respective stationary contacts in the same order of the latter upon reverse operations of said drum.

9. In a controller for an alternating current motor having a plurality of polyphase windings, in combination, stationary contacts, certain for connection to the motor windings and others for connection to a polyphase supply circuit, said contacts being arranged in two series and a contact drum rotatable in opposite directions from a neutral position to coöperate with said contacts for commutation and phase reversal of the motor windings, said drum having commutating segments arranged in two groups, identical in form, each to coact selectively with contacts of said two series, according to the direction of rotation of said drum, and said commutating segments being arranged to engage their respective stationary contacts in the same order of the latter upon reverse operations of said drum.

In witness whereof, I have hereunto subscribed my name.

CLARENCE T. EVANS.